(12) United States Patent
Kozuki

(10) Patent No.: US 11,666,108 B2
(45) Date of Patent: Jun. 6, 2023

(54) GLOVE

(71) Applicant: SHOWA GLOVE CO., Himeji (JP)

(72) Inventor: Kodai Kozuki, Himeji (JP)

(73) Assignee: SHOWA GLOVE CO., Himeji (JP)

(*) Notice: Subject to any disclaimer, the term of this patent is extended or adjusted under 35 U.S.C. 154(b) by 249 days.

(21) Appl. No.: 16/705,945

(22) Filed: Dec. 6, 2019

(65) Prior Publication Data

US 2021/0015188 A1     Jan. 21, 2021

(30) Foreign Application Priority Data

Jul. 19, 2019  (JP) .............................. JP2019-133396

(51) Int. Cl.

| | | |
|---|---|---|
| *A41D 19/015* | (2006.01) | |
| *D06N 3/10* | (2006.01) | |
| *C08J 5/02* | (2006.01) | |
| *D06N 3/00* | (2006.01) | |
| *D06N 3/08* | (2006.01) | |
| *A41D 19/00* | (2006.01) | |

(52) U.S. Cl.
CPC ... *A41D 19/01558* (2013.01); *A41D 19/0006* (2013.01); *C08J 5/02* (2013.01); *D06N 3/0009* (2013.01); *D06N 3/08* (2013.01); *D06N 3/10* (2013.01); *D06N 2205/023* (2013.01); *D06N 2205/04* (2013.01); *D06N 2205/10* (2013.01); *D06N 2211/103* (2013.01)

(58) Field of Classification Search
CPC ......... A41D 19/01558; A41D 19/0006; D06N 3/10; D06N 3/0009; D06N 3/08; D06N 2205/023; D06N 2205/04; D06N 2211/103; D06N 2205/10; C08J 5/02
See application file for complete search history.

(56) References Cited

U.S. PATENT DOCUMENTS

| | | | |
|---|---|---|---|
| 6,016,570 A | 1/2000 | Vande Pol et al. | |
| 2004/0031085 A1* | 2/2004 | Widdemer | A41D 19/01558 2/161.2 |
| 2004/0062918 A1* | 4/2004 | Johansson | A63B 71/146 428/206 |
| 2011/0099689 A1* | 5/2011 | Taylor | D06N 3/183 2/167 |

(Continued)

FOREIGN PATENT DOCUMENTS

| | | |
|---|---|---|
| JP | 2004156178 A | 6/2004 |
| JP | 2013104134 A | 5/2013 |

(Continued)

OTHER PUBLICATIONS

Machine Translation of Akimori (JP 2018016898 A) from Espacenet.com (Year: 2018).*

*Primary Examiner* — Chinessa T. Golden
(74) *Attorney, Agent, or Firm* — The Webb Law Firm

(57) ABSTRACT

A glove according to the present invention includes a glove body configured to cover a hand of a wearer. The glove body has an outermost layer including a matrix resin and cellulose particles and constituting an outer surface of the glove. The outermost layer includes the cellulose particles in the range of more than 1 part to 9 parts or less by mass based on 100 parts by mass of the matrix resin. At least some of the cellulose particles are at least partially exposed from the outer surface.

1 Claim, 3 Drawing Sheets

(56) References Cited

U.S. PATENT DOCUMENTS

| | | | |
|---|---|---|---|
| 2012/0151659 A1* | 6/2012 | Sanabria | C08J 7/18 2/167 |
| 2013/0305430 A1 | 11/2013 | Tomono | |
| 2014/0115750 A1 | 5/2014 | Kassam et al. | |
| 2017/0095019 A1 | 4/2017 | Milbocker et al. | |
| 2017/0348065 A1* | 12/2017 | Bluecher | A41D 31/12 |
| 2020/0164610 A1* | 5/2020 | Davis | B32B 25/14 |

FOREIGN PATENT DOCUMENTS

| | | | | |
|---|---|---|---|---|
| JP | 201816898 A | | 2/2018 | |
| JP | 2018016898 A | * | 2/2018 | ............ A41D 19/00 |
| JP | 2018532897 A | | 11/2018 | |
| WO | 2013007983 A1 | | 1/2013 | |

* cited by examiner

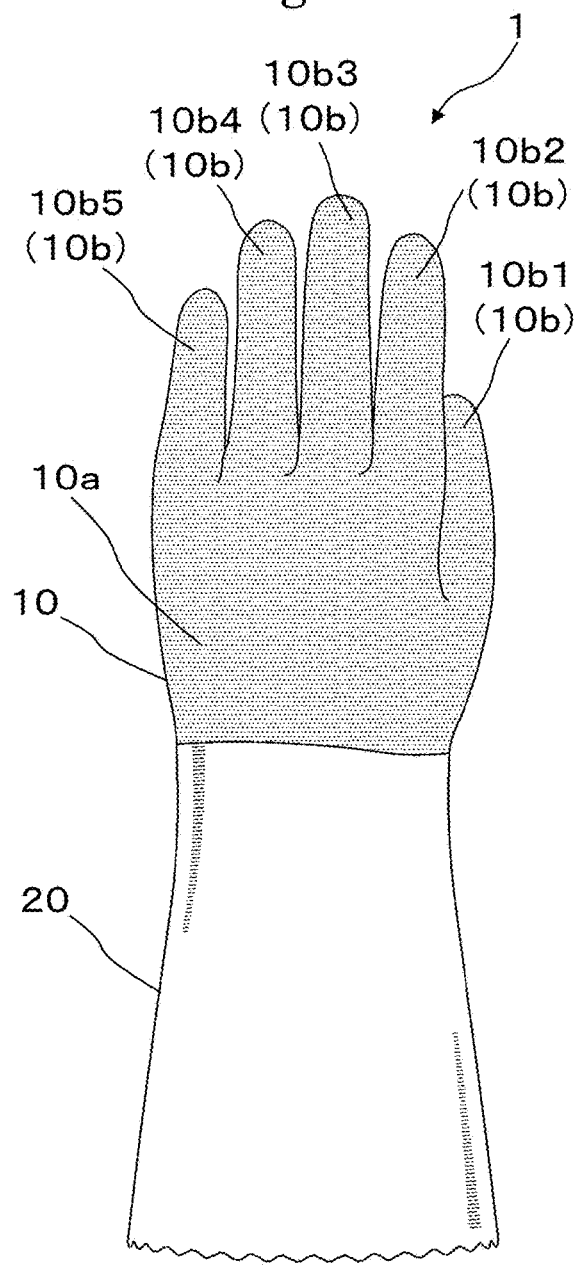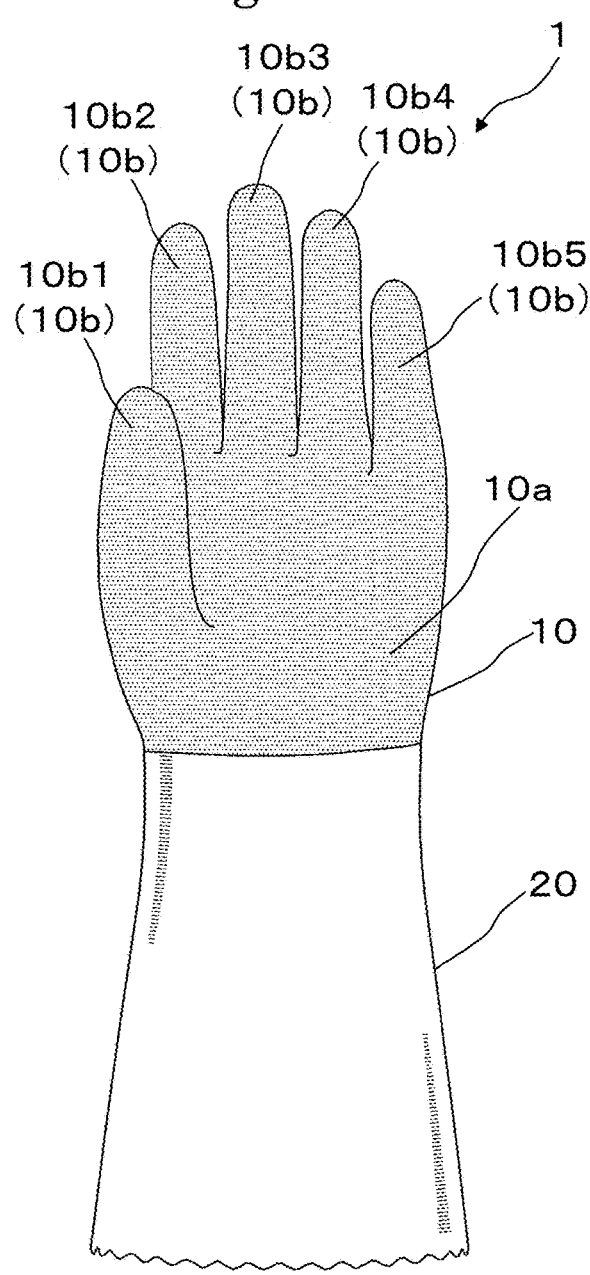

// GLOVE

CROSS-REFERENCE TO RELATED APPLICATION

This application claims priority to Japanese Patent Application No. 2019-133396, filed Jul. 19, 2019, the disclosure of which is hereby incorporated by reference in its entirety.

FIELD OF THE INVENTION

The present invention relates to a glove, and relates particularly to a glove used for grasping an object having a surface on which a film of hydrophilic liquid is formed.

BACKGROUND OF THE INVENTION

Conventionally, a glove having a slip-suppressing function is used to prevent or suppress an object from slipping on the outer surface of the glove when the wearer grasps the object.

For example, JP 2004-156178 A discloses a glove including a glove body configured to cover a hand of a wearer, in which slip-suppressing particles are arranged on an outer surface of the glove body (that is, an outermost layer of the glove body includes slip-suppressing particles) and the slip-suppressing particles are synthetic resin particles such as acrylic particles, glass particles, or rubber particles. It further discloses that, according to such a glove, the slip-suppressing particles arranged on the outer surface of the glove body prevent or suppress the object from slipping on the outer surface of the glove body and allow the object to be easily grasped by the wearer of the glove even in the case where the wearer handles an object with the wet surface, such as a dish during washing.

SUMMARY OF THE INVENTION

Technical Problem

The glove disclosed in JP 2004-156178 A has a problem that the slip-suppressing function is insufficient when the glove is used for grasping an object having a surface on which a film of hydrophilic liquid is formed. In particular, the problem is that, in the case where the object is an ice-containing object (which means ice itself or an object having the outer surface formed of ice), a film of water can be formed on the surface of the ice that is thawing, and thereby reduces the frictional resistance of the surface of the ice. Consequently, the ice-containing object is likely to slip on the outer surface of the glove body and is hardly grasped by the wearer.

Further, there is concern over the flaking of materials such as the slip-suppressing particles or a resin constituting the outermost layer of the glove body from the outermost layer of the glove body when the wearer holds an ice-containing object in his or her hand. A large amount of such flaking from the outer surface of the glove body causes an appearance and hygienic problem particularly in the case where the ice-containing object is food.

However, no sufficient consideration has been made to enable the glove to simultaneously exhibit the relatively sufficient slip-suppressing function and suppress the flaking from the outermost layer of the glove body, when the wearer grasps an object having a surface on which a film of hydrophilic liquid is formed, using the glove in which the outermost layer of the glove body includes the slip-suppressing particles.

In view of the aforementioned problems, it is an object of the present invention to provide a glove capable of exhibiting the relatively sufficient slip-suppressing function for an object having a surface on which a film of hydrophilic liquid is formed even when the wearer grasps such an object, and capable of suppressing the flaking from the outermost layer of the glove body.

Solution to Problem

A glove according to the present invention includes a glove body configured to cover a hand of a wearer, in which the glove body has an outermost layer including a matrix resin and cellulose particles and constituting an outer surface of the glove, the outermost layer includes the cellulose particles in the range of more than 1 part to 9 parts or less by mass based on 100 parts by mass of the matrix resin, and at least some of the cellulose particles are at least partially exposed from the outer surface.

BRIEF DESCRIPTION OF DRAWINGS

FIG. 1A is a view showing the overall configuration of a glove according to one embodiment of the present invention, as seen from the back side.

FIG. 1B is a view showing the overall configuration of the glove according to the one embodiment of the present invention, as seen from the palm side.

DETAILED DESCRIPTION OF THE PREFERRED EMBODIMENT

Figure 2A:
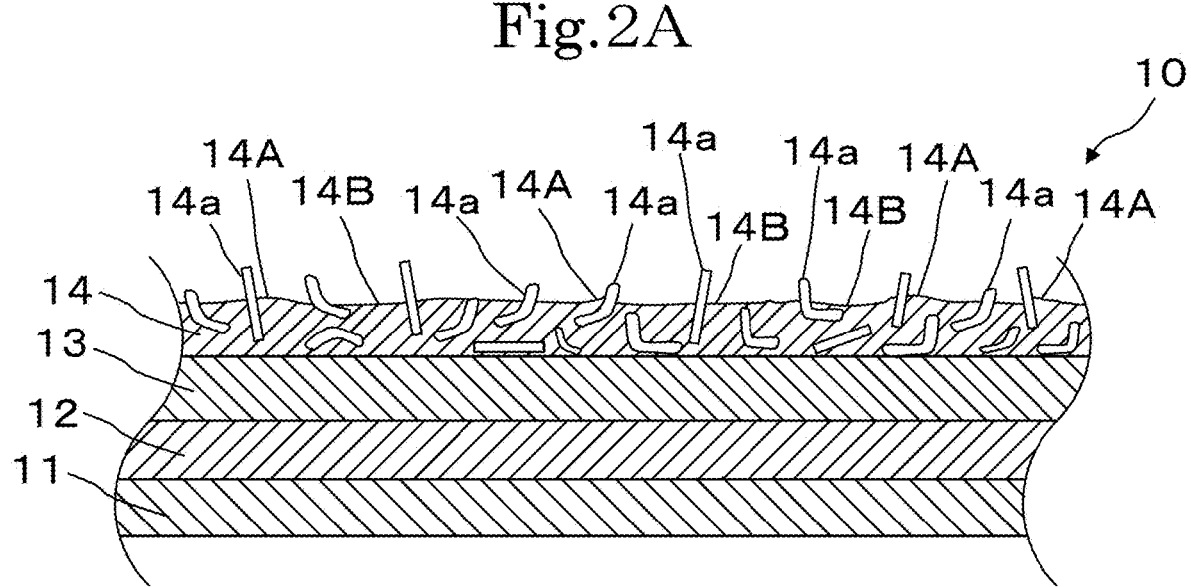
FIG. 2A is a cross-sectional view of a glove body of the glove according to the one embodiment of the present invention.

Hereinafter, a glove according to one embodiment of the present invention will be described with reference to the drawings.

As shown in FIG. 1A and FIG. 1B, a glove 1 according to this embodiment includes a glove body 10 configured to cover a hand of a wearer, and a cuff 20 connected to the glove body 10 and configured to cover a wrist and a part of a forearm of the wearer.

The glove body 10 includes a body bag 10a having a bag shape to cover the back and the palm of the hand of the wearer, and finger bags 10b each extending from the body bag 10a to cover each finger of the wearer. The finger bags 10b are constituted by a first finger part 10b1, a second finger part 10b2, a third finger part 10b3, a fourth finger part 10b4, and a fifth finger part 10b5 that respectively cover a first finger (a thumb), a second finger (an index finger), a third finger (a middle finger), a fourth finger (a ring finger), and a fifth finger (a little finger), of the wearer. The first finger part 10b1 to the fifth finger part 10b5 have a tubular shape with their fingertip parts closed.

As shown in FIG. 2A, the glove body 10 has a four-layered structure. Specifically, the glove body 10 includes a fiber layer 11, a first resin layer 12 covering an outer surface of the fiber layer 11, a second resin layer 13 covering an outer surface of the first resin layer 12, and a slip-suppressing layer 14 covering an outer surface of the second resin layer 13. In the glove body 10, the fiber layer 11 is an innermost layer (i.e., a layer that comes in contact with the hand of the wearer of the glove 1) constituting the inner surface of the glove 1, and the slip-suppressing layer 14 is an outermost layer constituting the outer surface of the glove body 10.

The fiber layer 11 is formed by knitting a fiber material. Examples of the fiber material for use include a yarn made of any known general-purpose fiber (e.g., nylon fiber, polyester fiber, polyethylene fiber, cotton, acrylic fiber, rayon fiber), ultrahigh molecular weight polyethylene fiber, aramid fiber, glass fiber, or any known cut resistant fiber (e.g., stainless-steel fiber), and a composite yarn made of the various fibers above.

The fiber layer 11 is produced, for example, by knitting a fiber material into a glove shape using a glove knitting machine, or by knitting a fiber material using a circular knitting machine, a flat knitting machine, a warp knitting machine or the like, cutting the knitted fabric into a given shape, and sewing the cut fabric into a glove shape.

Generally, the thicker a glove is, the less flexible it becomes, which causes its wearer to be less likely to get the sense of touch at the moment when the wearer grasps the object. Thus, if a glove knitting machine is used, it is preferable to choose a 10 gauges or more and 26 gauges or less knitting machine, and for ease of knitting, choose a 13 gauges or more and 21 gauges or less knitting machine.

The fiber layer 11 is preferably formed to have a thickness of 0.1 mm or more and 1.5 mm or less.

The thickness of the fiber layer 11 is measured by a film thickness gauge (for example, PG-20 with a measuring force of 20 gf, manufactured by TECLOCK Co., Ltd.) before the first resin layer 12 is formed thereon. The thickness of the fiber layer 11 is obtained by arithmetically averaging the values measured at five given places using the film thickness gauge.

The fiber layer 11 may be, for example, subjected to various treatments using a softener, a water and oil repellant, an antimicrobial or the like, or have an ultraviolet blocking function imparted by applying an ultraviolet absorber to the fiber layer 11 or impregnating the fiber layer 11 with the ultraviolet absorber. In order to impart the various functions to the fiber layer 11, the fiber layer 11 may be formed by knitting a fiber material including the aforementioned various chemical agents (for example, a fiber material having the aforementioned various chemical agents kneaded therein).

The first resin layer 12 is formed to cover the outer surface of the fiber layer 11. The first resin layer 12 is preferably formed to cover the entire area of the outer surface of the fiber layer 11.

Examples of a resin constituting the first resin layer 12 include various known resins such as vinyl chloride resin, natural rubber, nitrile butadiene rubber, chloroprene rubber, fluororubber, silicone rubber, isoprene rubber, polyurethane, acrylic resin, or their modified products (e.g., a carboxyl-modified product). Alternatively, these various known resins are used in combination.

The various known resins may be mixed with: a generally used vulcanizing agent such as sulfur; a vulcanization accelerator such as zinc dimethylthiocarbamate; a vulcanization accelerator such as zinc oxide; a cross-linking agent such as a blocked isocyanate; a plasticizer or a softener such as a mineral oil or a phthalate ester; an antioxidant or an aging inhibitor such as 2,6-di-t-butyl-4-methylphenol; a thickener such as an acrylic polymer or a polysaccharide; a blowing agent such as azocarbonamide; a foaming agent or a foam stabilizer such as sodium stearate; an additive such as an anti-tacking agent, e.g., a paraffin wax; and a filler such as carbon black, calcium carbonate, or fine powder silica.

The first resin layer 12 is preferably formed to have a thickness of 0.05 mm or more and 1.5 mm or less.

The thickness of the first resin layer 12 is measured by observing its cross section at a magnification of 300 times using a digital microscope (model VHX-6000, manufactured by KEYENCE CORPORATION), and then arithmetically averaging the values measured at 10 places at intervals of 500 μm. The cross-sectional observation using the digital microscope is carried out by observing a cross section of the center of a palm of the glove.

The center of the palm of the glove herein means an area in the palm near the point at which a straight line drawn in a longitudinal direction of the glove (i.e., a direction in which the third finger part 10$b$3 extends) from the crotch between the third finger part 10$b$3 and the fourth finger part 10$b$4 intersects with a straight line drawn in a lateral direction of the glove (i.e., a direction orthogonal to the longitudinal direction) from the crotch between the first finger part 10$b$1 and the second finger part 10$b$2.

The first resin layer 12 is preferably formed as a non-porous resin layer. The first resin layer 12 thereby increases its strength. The non-porous resin layer herein means a layer having no visible voids when the cross section thereof is observed at a magnification of 200 times using a digital microscope (model VHX-6000, manufactured by KEYENCE CORPORATION). However, any void resulting from unexpected foam or bubbles shall be ignored.

It is preferable that the first resin layer 12 penetrate partially into voids among fibers of the fiber layer 11, in terms of allowing the voids among fibers of the fiber layer 11 to hold air and in terms of increasing adhesiveness to the fiber layer 11.

The second resin layer 13 is formed of the same resin as that of the first resin layer 12. The second resin layer 13 is formed to cover the outer surface of the first resin layer 12. The second resin layer 13 is preferably formed to cover the entire area of the outer surface of the first resin layer 12. The second resin layer 13 is formed to increase the thickness of the resin layer. As in the case of the first resin layer 12, the second resin layer 13 is also preferably formed as a non-porous resin layer.

The second resin layer 13 may be formed of the same resin as that of the first resin layer 12, or may be formed of a different resin from that of the first resin layer 12. In the case where the second resin layer 13 is formed of a different resin from that of the first resin layer 12, an adhesive layer may be provided between the first resin layer 12 and the second resin layer 13 to increase adhesiveness therebetween. The adhesive layer can be formed of any known adhesive such as an acrylic-based or urethane-based adhesive. The adhesive used preferably has a solubility parameter (SP value) that falls between the SP value of the material of the first resin layer 12 and the SP value of the material of the second resin layer 13.

The second resin layer 13 is generally formed to have a thickness of 0.01 mm or more and 1.0 mm or less.

The thickness of the second resin layer 13 is measured in the same manner as the thickness of the first resin layer 12.

The slip-suppressing layer 14 is formed to cover the outer surface of the second resin layer 13. The slip-suppressing layer 14 is the outermost layer constituting the outer surface of the glove 1. The slip-suppressing layer 14 is generally formed to have a thickness of 0.01 mm or more and 0.1 mm or less. The slip-suppressing layer 14 is preferably formed to have a thickness of 0.02 mm or more and 0.07 mm or less.

The thickness of the slip-suppressing layer 14 is measured by observing its cross section at a magnification of 300 times using a digital microscope (model VHX-6000, manufactured by KEYENCE CORPORATION), and then arithmetically averaging the values measured at any 50 places.

The slip-suppressing layer 14 may be formed on the entire area of the outer surface of the second resin layer 13, but may be formed only on part of the outer surface of the second resin layer 13, that is, only on an area that can come into contact with an object having a surface on which a film of hydrophilic liquid is formed, when the wearer grasps such an object. For example, the slip-suppressing layer 14 may be formed only on the palm side of the glove body 10, or may be formed only on the fingertip parts on the palm side. The slip-suppressing layer 14 is configured to suppress an object having a surface on which a film of hydrophilic liquid is formed, particularly an ice-containing object, from slipping on the outer surface of the glove body 10 due to the film of hydrophilic liquid (the film of water in the case where the object is an ice-containing object) formed on the surface of the object when the wearer of the glove 1 grasps such an object. Specifically, the slip-suppressing layer 14 includes a matrix resin and cellulose particles 14a. The matrix resin herein means a combination of a resin and an additive other than the cellulose particles 14a in the case where the resin includes the additive other than the cellulose particles 14a, and means a resin itself in the case where the resin does not include any additive other than the cellulose particles 14a. Examples of the additive other than the cellulose particles 14a include a plasticizer, a pH adjuster, a vulcanizing agent, a metal oxide, a vulcanization accelerator, an aging inhibitor, an inorganic filler, a defoaming agent, a thickener, and a pigment.

The hydrophilic liquid herein means a liquid that homogenously mixes with water at a given ratio at normal temperature (for example, 25° C.). Examples of the hydrophilic liquid include water, methanol, ethanol, n-propyl alcohol, isopropyl alcohol, and acetone.

The resin included in the slip-suppressing layer 14 can be the same resin as that constituting the first resin layer 12.

The cellulose particles 14a included in the slip-suppressing layer 14 can be any known various cellulose particles, regenerated cellulose particles, or the like. The cellulose particles 14a are preferably particles of ground natural wood cellulose (hereinafter referred to as ground cellulose particles). Since such ground cellulose particles typically have different shapes from one another, a relatively high proportion of particles have surfaces and angular portions that come into contact with an object. The ground cellulose particles can thereby have relatively large portions that come into contact with an object having a surface on which a film of hydrophilic liquid is formed. Thus, use of the ground cellulose particles as the cellulose particles 14a included in the slip-suppressing layer 14 improves the slip-suppressing function at the moment of grasping the object. As the cellulose particles 14a, KC FLOCK (registered trademark), for example, can be used. As KC FLOCK, KC FLOCK W-100GK (manufactured by Nippon Paper Industries Co., Ltd.), for example, can be used.

The cellulose particles 14a are included in the range of more than 1 part and 9 parts or less by mass based on 100 parts by mass of the matrix resin. The amount of the cellulose particles 14a included is preferably 2 parts or more by mass, more preferably 4 parts or more by mass based on 100 parts by mass of the matrix resin.

The cellulose particles 14a included in the slip-suppressing layer 14 within the aforementioned range can sufficiently suppress an object having a surface on which a film of hydrophilic liquid is formed, in particular an ice-containing object, from slipping on the outer surface of the glove body 10 due to the film of hydrophilic liquid (the film of water in the case where the object is an ice-containing object) formed on the surface of the object, and can be sufficiently suppressed from flaking from the slip-suppressing layer 14.

The cellulose particles 14a are preferably fibrous particles. The fibrous particles are the particles having a ratio L/D being 2.0 or more, more preferably 2.5 or more, still more preferably 3.0 or more, where D represents the width of each particle and L represents the length of the particle. In the case where the cellulose particles 14a are fibrous particles, the length L is preferably 5 μm or more and 100 μm or less, more preferably 10 μm or more and 95 μm or less, while the width D is preferably 1 μm or more and 25 μm or less, more preferably 3 μm or more and 20 μm or less. The width of the particle means a length in the short side direction of each fibrous particle. In the case where the length in the short side direction varies according to the measurement position, the largest value is regarded as the width of the particle. The length of the particle means a length in the longitudinal direction of each fibrous particle. In the case where the fibrous particle has a linear shape, the length of the particle means the length from an end of the linear shape to the other end thereof. In the case where the fibrous particle has a curled shape (for example, a crimped shape) or a bent shape (for example, an L-shape or a V-shape), the length of the particle means the length of the line segment connecting an end of the particle and the other end thereof in the curled or bent state.

The width D of the particle and the length L of the particle can be obtained by measuring L and D of any 10 particles while observing the particles before being mixed with the resin or the like at a magnification of 500 or 1000 times using a digital microscope (model VHX-6000, manufactured by KEYENCE CORPORATION), and then arithmetically averaging the measured values of L and D, respectively.

The cellulose particles 14a have a relatively high water absorption rate since cellulose includes a large number of hydroxyl groups. The relatively high water absorption rate herein means that the saturated water absorption rate is 7% or more in an environment at 25° C. and at 65% relative humidity.

Figure 3A:
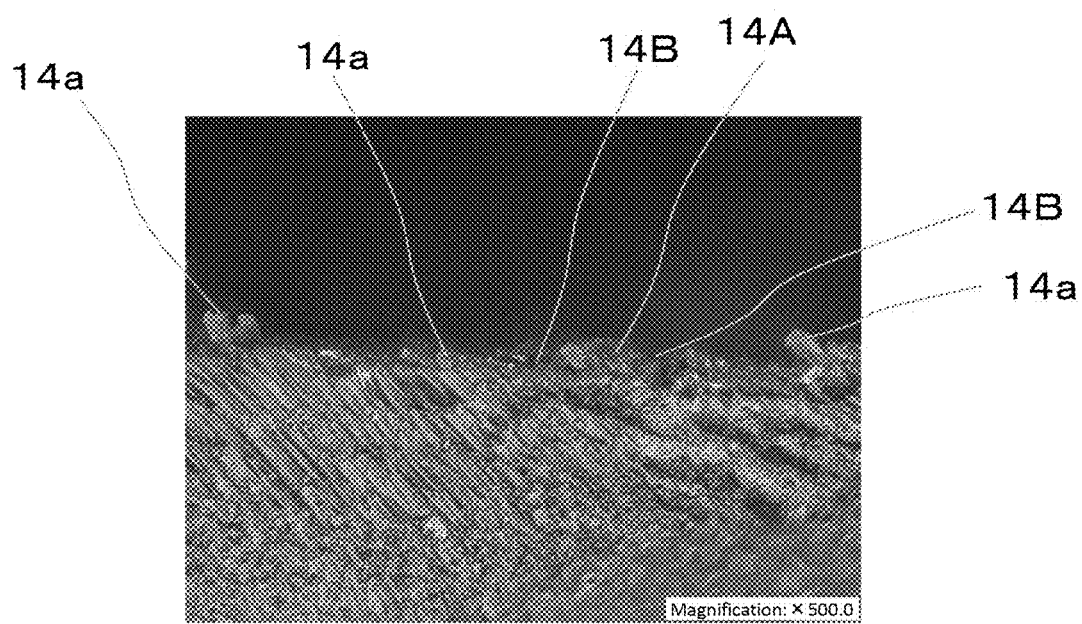
FIG. 3A is a microscopic photo showing an enlarged cross-sectional view of a part of a slip-suppressing layer of a glove according to Example 1.

As shown in FIG. 2A, the slip-suppressing layer 14 includes the cellulose particles 14a. At least some of the cellulose particles 14a are at least partially exposed from the outer surface of the slip-suppressing layer 14. This is supported also by a microscopic photo (see FIG. 3A) showing an enlarged cross-sectional view of a part of a slip-suppressing layer of a glove according to Example 1, which will be described later. In FIG. 3A, the cellulose particles 14a are shown with lead lines. The cellulose particles 14a that are at least partially exposed from the outer surface of the slip-suppressing layer 14 suppress an object having a surface on which a film of hydrophilic liquid is formed, particularly an ice-containing object, from slipping on the outer surface of the glove body 10 due to the film of hydrophilic liquid (the film of water in the case where the object is an ice-containing object) formed on the surface of the object when the wearer of the glove 1 grasps the object. This enables the wearer of the glove 1 to easily grasp the object having the surface on which the film of hydrophilic liquid is formed. The part of the cellulose particles 14a that is not exposed from the outer surface of the slip-suppressing layer 14 is embedded in the slip-suppressing layer 14 and secured therein; therefore, the cellulose particles 14a can be suppressed from excessively falling from the slip-suppressing layer 14 when the wearer of the glove 1 grasps an object having a surface on which a film of hydrophilic liquid is formed.

Although it is uncertain how the glove 1 according to this embodiment suppresses slipping when an object having a surface on which a film of hydrophilic liquid is formed is grasped, the present inventors assume the reason for the slip suppression as follows. As described above, cellulose in the cellulose particles 14a includes a large number of hydroxyl groups, and is thereby assumed to achieve relatively high affinity between the exposed sides of the cellulose particles 14a and the surface of the object. Accordingly, the portion in which the surface of the object comes in contact with the exposed sides of the cellulose particles 14a has a relatively high frictional resistance. The object is thus suppressed from slipping on the outer surface of the glove 1.

In particular, in the case where the cellulose particles 14a are fibrous particles, such cellulose particles 14a each having a long narrow shape can efficiently scratch into the film of hydrophilic liquid on the surface of the object. Thus, the exposed sides of the cellulose particles 14a easily come into contact with the surface of the object. The cellulose particles 14a each having a fibrous shape easily follow the motion of the object. As a result, the portion in which the surface of the object comes in contact with the exposed sides of the cellulose particles 14a has a relatively high frictional resistance. This allows the object to be suppressed from slipping on the outer surface of the glove 1.

As shown in FIG. 2A, in the slip-suppressing layer 14 of the glove 1 according to this embodiment, the cellulose particles 14a are assumed to be present in a relatively dispersed manner. Based on the assumption that the cellulose particles 14a are present in the slip-suppressing layer 14 in a relatively dispersed manner, the slip-suppressing layer 14 is assumed to have projections 14A formed by relatively slightly rising outward and recesses 14B formed by being relatively slightly recessed on the second resin layer 13 side.

This is supported also by the fact that, when a comparison is made between the microscopic photo (FIG. 3A) showing the enlarged cross-sectional view of the part of the slip-suppressing layer of the glove according to Example 1 to be described later and the microscopic photo (FIG. 3B) of an enlarged cross-sectional view of a part of a slip-suppressing layer of a glove according to Comparative Example 1 to be described later, the glove according to Example 1 (see FIG. 3A) in which 6.9 parts by mass of cellulose particles are included has a smaller degree of unevenness on the outer surface of the slip-suppressing layer 14 than that of the glove according to Comparative Example 1 (see FIG. 3B) in which 27.6 parts by mass of cellulose particles are included.

Since it is likely that the cellulose particles 14a are present in the slip-suppressing layer 14 in a relatively dispersed manner, the glove according to Example 1 is assumed to have the slip-suppressing layer 14 in which the cellulose particles 14a are more frequently in contact with resin and are thereby more easily held by the resin.

As a result, in the glove according to Example 1, the cellulose particles 14a are assumed to be less likely to flake from the slip-suppressing layer 14.

Thus, the glove 1 according to this embodiment is assumed to be able to sufficiently suppress the cellulose particles 14a from flaking from the slip-suppressing layer 14 while exhibiting the sufficient slip-suppressing effect for an object having a surface on which a film of hydrophilic liquid is formed.

The average particle size of the cellulose particles 14a is preferably 10 μm or more and 45 μm or less, more preferably 17 μm or more and 45 μm or less. The cellulose particles 14a with the average particle size falling within the aforementioned numerical range can more sufficiently suppress an object having a surface on which a film of hydrophilic liquid is formed, in particular an ice-containing object, from slipping on the outer surface of the glove body 10 due to the film of hydrophilic liquid (the film of water in the case where the object is an ice-containing object) formed on the surface of the object. Further, the cellulose particles 14a having such an average particle size can be more sufficiently suppressed from excessively flaking from the slip-suppressing layer 14 when the wearer of the glove 1 grasps the object. Such cellulose particles 14a can exhibit the sufficient slip-suppressing effect also for an object having a surface on which a film of hydrophilic liquid is not formed.

The average particle size of the cellulose particles 14a is measured before they are mixed, using a laser diffraction-type particle-size-distribution measuring apparatus (Mastersizer 2000 manufactured by Malvern Panalytical Ltd) as a measuring device. Specifically, the measurement is performed using the dedicated software called Mastersizer 2000 Software in which the scattering type measurement mode is employed. A wet cell through which dispersion liquid with a measurement sample (cellulose particles) dispersed therein is circulated is irradiated with a laser beam to obtain a scattered light distribution from the measurement sample. Then, the scattered light distribution is approximated according to a log-normal distribution, and a particle size corresponding to the cumulative frequency of 50% (D50) within the preset range from the minimum value of 0.021 μm to the maximum value of 2000 μm in the obtained particle size distribution (horizontal axis, σ) is determined as the average particle size. The dispersion liquid for use is prepared by adding 60 mL of 0.5 mass % hexametaphosphoric acid solution to 350 mL of purified water. The concentration of the measurement sample in the dispersion liquid is 10%. Before the measurement, the dispersion liquid including the measurement sample is processed for two minutes using an ultrasonic homogenizer. The measurement is performed while the dispersion liquid including the measurement sample is agitated at an agitating speed of 1500 rpm.

Short fibers (such as pile) used for being implanted in the inner surface of a glove have a length of, for example, 300 μm or more and 800 μm or less, which are significantly longer than the cellulose particles 14a having the average particle size of, as aforementioned, 10 μm or more and 45 μm or less (hereinafter referred to simply as the aforementioned cellulose particles 14a).

Thus, in the case where the short fibers in the same number as that of the aforementioned cellulose particles 14a are included in the slip-suppressing layer 14 having the same thickness as aforementioned, the longer the short fibers are as compared with the average particle size of the aforementioned cellulose particles 14a, the more densely the short fibers should be included in the slip-suppressing layer 14. Further, the more densely the short fibers are included in the slip-suppressing layer 14, the harder the slip-suppressing layer 14 with the short fibers included therein should be as compared with the slip-suppressing layer 14 with the aforementioned cellulose particles 14a included therein.

The slip-suppressing layer 14 including the short fibers has a higher proportion of short fibers exposed from the slip-suppressing layer 14 than that of the slip-suppressing layer 14 including the aforementioned cellulose particles 14a, and thus becomes less likely to exhibit the slip-suppressing effect for an object having a surface on which a film of hydrophilic liquid is not formed. Further, such a slip-suppressing layer 14 having a high proportion of short fibers exposed therefrom becomes less resistant to abrasion.

The longer the short fibers are as compared with the average particle size of the aforementioned cellulose particles 14a, the more likely the short fibers are to agglutinate in mixing materials (a third coating liquid to be described later) as compared with the aforementioned cellulose particles 14a. Thus, the mixing materials including the short fibers become more likely to be destabilized than the mixing materials including the aforementioned cellulose particles 14a.

A possible way of suppressing the short fibers as aforementioned from being densely included in the slip-suppressing layer 14 may be to reduce the number of short fibers included therein. In such a case, however, the fewer the short fibers are included in the slip-suppressing layer 14, the fewer the short fibers are exposed from the surface of the slip-suppressing layer 14. As a result, the slip-suppressing layer 14 should decrease its slip-suppressing function for an object having a surface on which a film of hydrophilic liquid is formed.

Another possible way of suppressing the short fibers from being densely included in the slip-suppressing layer 14 may be to increase the thickness of the slip-suppressing layer 14. However, the slip-suppressing layer 14 may have an increased elastic modulus by the short fibers dispersed in the resin. Further, the thicker the slip-suppressing layer 14 is, the harder it could be, depending on the type of resin included in the slip-suppressing layer 14.

In contrast, the aforementioned cellulose particles 14a are significantly shorter than the short fibers, and thus less likely to cause the problems concerned as aforementioned when included in the slip-suppressing layer 14. Thus, the aforementioned cellulose particles 14a included in the slip-suppressing layer 14 enable the slip-suppressing layer 14 to exhibit a more sufficient slip-suppressing function while, in particular, sufficiently suppressing the slip-suppressing layer 14 from being hardened.

Figure 2B:
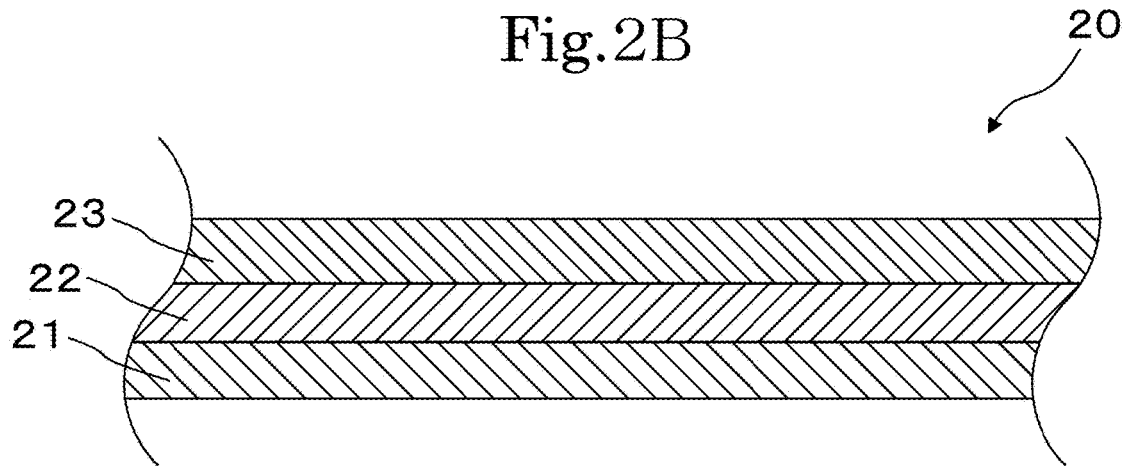
FIG. 2B is a cross-sectional view of a cuff of the glove according to the one embodiment of the present invention.

The cuff 20 is formed in a tubular shape. As shown in FIG. 2B, the cuff 20 has a three-layered structure. Specifically, the cuff 20 includes a fiber layer 21, a first resin layer 22 covering the outer surface of the fiber layer 21, and a second resin layer 23 covering the outer surface of the first resin layer 22. In the cuff 20, the fiber layer 21 is an innermost layer while the second resin layer 23 is an outermost layer. That is, the cuff 20 has a different layered structure from that of the glove body 10 in that it has the second resin layer 23 as the outermost layer.

In the glove 1 according to this embodiment, the cuff 20 is formed continuously and integrally with the glove body 10. That is, in the glove 1, the two fiber layers (i.e., the fiber layer 11 and the fiber layer 21), the two first resin layers (i.e., the first resin layer 12 and the first resin layer 22), and the two second resin layers (i.e., the second resin layer 13 and the second resin layer 23) are respectively formed continuously and integrally with each other; thus, the fiber layer 21 has the same configuration as the fiber layer 11, the first resin layer 22 has the same configuration as the first resin layer 12, and the second resin layer 23 has the same configuration as the second resin layer 13. Thus, no explanation will be given on the configurations of the fiber layer 21, the first resin layer 22, and the second resin layer 23.

The glove 1 configured as above can be produced according to, for example, the following steps.

First, a fiber glove including the glove body 10 and the cuff 20 (i.e., a fiber glove including the fiber layers 11 and 21) is prepared. The fiber glove including the glove body 10 and the cuff 20 (i.e., the fiber glove including the fiber layers 11 and 21) is produced using, for example, a glove knitting machine.

Next, a first coating liquid including a resin to form the first resin layers 12 and 22 covering the outer surface of the fiber glove is applied to the outer surface of the fiber glove. For example, the fiber glove is put on a hand form to apply the first coating liquid to the entire area of the outer surface of the fiber glove. More specifically, the first coating liquid is applied to the entire area of the outer surface of the fiber glove by immersing the fiber glove put on the hand form in the first coating liquid. The hand form is any known hand form made of ceramic, metal, or the like. After having the first coating liquid applied thereto, the fiber glove is allowed to dry at a certain temperature over a certain period of time to form the first resin layers 12 and 22 on the outer surface of the fiber glove. For example, after having the first coating liquid applied thereto, the fiber glove put on the hand form is placed in an oven for drying at 80° C. for 60 minutes to form the first resin layers 12 and 22 on the entire area of the outer surface of the fiber glove.

Before the first coating liquid is applied, the fiber glove put on the hand form may be entirely immersed in a coagulant solution to pretreat the outer surface of the fiber glove. Examples of the coagulant solution include a solution prepared by dissolving 1-5 parts by mass of calcium nitrate in 100 parts by mass of methanol.

As the resin of the first coating liquid, any known resin as aforementioned can be used. In addition to the resin, the first coating liquid may include various additives such as a pH adjuster, a vulcanizing agent, a metal oxide, a vulcanization accelerator, an aging inhibitor, an inorganic filler, a defoaming agent, a thickener, and a pigment. For the pH adjuster, 0.2 part or more and 0.7 part or less by mass thereof is preferably included based on 100 parts by mass of the resin and the aforementioned various additives. Examples of the pH adjuster include potassium hydroxide. For the vulcanizing agent, 0.1 part or more and 2.0 parts or less by mass thereof is preferably included based on 100 parts by mass of the resin and the aforementioned various additives. Examples of the vulcanizing agent include sulfur. For the metal oxide, 1.0 part or more and 4.0 parts or less by mass thereof is preferably included based on 100 parts by mass of the resin and the aforementioned various additives. Examples of the metal oxide include zinc oxide. For the vulcanization accelerator, 0.1 part or more and 2.0 parts or less by mass thereof is preferably included based on 100 parts by mass of the resin and the aforementioned various additives. Examples of the vulcanization accelerator include an accelerator based on sodium dithiocarbamate (for example, NOCCELER BZ (manufactured by OUCHI SHINKO CHEMICAL INDUSTRIAL CO., LTD.) composed mainly of zinc dibutyldithiocarbamate). For the aging inhibitor, 0.3 part or more and 0.7 part or less by mass thereof is preferably included based on 100 parts by mass of the resin and the aforementioned various additives.

Examples of the aging inhibitor include polynuclear phenols (for example, VULKANOX (registered trademark) BKF). The inorganic filler, the defoaming agent, the thickener, and the pigment each are added in an appropriate amount as needed. Various known inorganic fillers, defoaming agents, thickeners, and pigments can be used.

Next, a second coating liquid including a resin to form the second resin layers 13 and 23 covering the outer surfaces of the first resin layers 12 and 22 is applied to the outer surfaces of the first resin layers 12 and 22. For example, the second coating liquid is applied to the entire areas of the outer surfaces of the first resin layers 12 and 22. More specifically, the second coating liquid is applied to the entire areas of the outer surfaces of the first resin layers 12 and 22 by immersing the fiber glove with the first resin layers 12 and 22 formed thereon in the second coating liquid. After having the second coating liquid applied thereto, the fiber glove is allowed to dry at a certain temperature over a certain period of time to form the second resin layers 13 and 23 on the outer surfaces of the first resin layers 12 and 22. For example, after having the second coating liquid applied thereto, the fiber glove put on the hand form is placed in an oven for drying at 80° C. for 60 minutes to form the second resin layers 13 and 23 on the entire areas of the outer surfaces of the first resin layers 12 and 22.

As the resin included in the second coating liquid, the same resin as that included in the first coating liquid can be used. Similar to the first coating liquid, the second coating liquid may include, in addition to the resin, a pH adjuster, a vulcanizing agent, a metal oxide, a vulcanization accelerator, an aging inhibitor, an inorganic filler, a defoaming agent, a thickener, a pigment, or the like.

Next, a third coating liquid to form the slip-suppressing layer 14 covering the outer surface of the second resin layer 13 (i.e., the second resin layer of the glove body 10) is applied to the outer surface of the second resin layer 13. For example, the third coating liquid is applied to the entire area of the outer surface of the second resin layer 13. More specifically, the third coating liquid is applied to the entire area of the outer surface of the second resin layer 13 by immersing only the glove body 10 side of the fiber glove with the second resin layers 13 and 23 formed thereon in the third coating liquid. After having the third coating liquid applied thereto, the fiber glove is allowed to dry at a certain temperature over a certain period of time to form the slip-suppressing layer 14 on the outer surface of the second resin layer 13. For example, after having the third coating liquid applied thereto, the fiber glove put on the hand form is placed in an oven for drying at 80° C. for 60 minutes and then at 120° C. for 30 minutes, to form the slip-suppressing layer 14 on the entire area of the outer surface of the second resin layer 13.

The third coating liquid includes a matrix resin and the cellulose particles 14a. The third coating liquid can be obtained by mixing the matrix resin and the cellulose particles 14a. As the resin included in the third coating liquid, the same resin as that included in the first coating liquid can be used. As the cellulose particles 14a included in the third coating liquid, any known cellulose particles as aforementioned can be used. The third coating liquid may include an additive (such as a plasticizer and the same various additives as those included in the first coating liquid) other than the cellulose particles 14a. In the case where the matrix resin includes an additive other than the cellulose particles 14a, examples of the additive include a plasticizer and the various additives that may be included in the first coating liquid.

The third coating liquid includes more than 1 part and 9 parts or less by mass of the cellulose particles 14a based on 100 parts by mass of the matrix resin.

The cellulose particles 14a are preferably included in the third coating liquid while being dispersed therein. A possible way of dispersing the cellulose particles 14a may be to sift the cellulose particles 14a before the cellulose particles 14a are mixed in the third coating liquid. The sieve used therefor has a mesh size of preferably 150 μm to 600 μm, more preferably 200 μm to 500 μm.

The glove 1 according to this embodiment can be obtained as described above.

The glove according to this embodiment is configured as above, and thus has the following advantageous effects.

A glove according to the present invention includes:
a glove body configured to cover a hand of a wearer, in which
the glove body has an outermost layer including a matrix resin and cellulose particles and constituting an outer surface of the glove,
the outermost layer includes the cellulose particles in the range of more than 1 part to 9 parts or less by mass based on 100 parts by mass of the matrix resin, and
at least some of the cellulose particles are at least partially exposed from the outer surface.

Such a configuration allows the cellulose particles exposed from the outer surface to come into contact with the surface of an object, and thus can exhibit the relatively sufficient slip-suppressing function for the object even when such an object has a surface on which a film of hydrophilic liquid is formed.

Further, the configuration can suppress flaking from the outermost layer.

The glove according to the present invention is not limited to the aforementioned embodiment. The glove according to the present invention is not limited by the aforementioned operational advantages, either. Various modifications can be made for the glove according to the present invention without departing from the gist of the present invention.

The aforementioned embodiment has been described by taking, for example, the case where the glove body 10 has the four-layered structure while the cuff 20 has the three-layered structure (i.e., the glove body 10 has one fiber layer 11, two resin layers (the first resin layer 12 and the second resin layer 13), and one slip-suppressing layer 14 while the cuff 20 has one fiber layer 21 and two resin layers (the first resin layer 22 and the second resin layer 23)). However, the layered structures of the glove body 10 and the cuff 20 are not limited to the aforementioned embodiment. For example, the glove body 10 may have only one resin layer constituted by the first resin layer 12 to form the three-layered structure (i.e., one fiber layer 11, one resin layer, and one slip-suppressing layer 14), and the cuff 20 may have only one resin layer constituted by the first resin layer 22 to form the two-layered structure (i.e., one fiber layer 21 and one resin layer).

It should be noted that the glove body 10 formed to have two resin layers and one slip-suppressing layer on the outer surface of one fiber layer 11, that is, to have three resin-inclusive layers on the outer surface of one fiber layer 11 can improve its resistance to chemicals (such as acetic acid) and organic solvents. Specifically, the glove body 10 formed to have the three resin-inclusive layers has thick resin-inclusive layers, and the layered structure of the glove body 10 suppresses pinholes from being formed in the resin-inclusive layers; thus, the glove body 10 can improve its permeation resistance to chemicals and organic solvents. The glove including the glove body 10 formed to have the three resin-inclusive layers as described above can improve resistance to chemicals and organic solvents, and is thus suitable for food applications in which acetic acid, edible oil or the like is used.

EXAMPLES

Hereinafter, the present invention will be more specifically described with reference to the examples. The following examples are provided for more specifically describing the present invention, and do not intend to limit the scope of the present invention.

Example 1

The glove according to Example 1 was produced using the following materials.

Fiber Layer

Three polyester two-ply yarns (each made of two 77 dtex polyester single yarns twisted together) were seamlessly knitted into a fiber layer using a glove knitting machine (model 13G N-SFG, manufactured by SHIMA SEIKI MFG., LTD.). The fiber layer was produced as a fiber glove including a glove body and a cuff.

First Resin Layer

The aforementioned fiber layer was put on a three-dimensional metal hand form, and the three-dimensional hand form was heated to 60° C.

Next, the fiber layer put on the heated three-dimensional hand form was immersed in a coagulant solution in which 3 parts by mass of calcium nitrate is dissolved in 100 parts by mass of methanol, to apply the coagulant solution to the entire area of the outer surface of the fiber layer. After the application of the coagulant solution, methanol was partially volatilized from the fiber layer.

Then, the fiber layer with the coagulant solution applied thereto was entirely immersed in a first coating liquid for forming a first resin layer, to apply the first coating liquid to the entire area of the outer surface of the fiber layer.

The fiber layer with the first coating liquid applied thereto was then dried in an oven at 80° C. for 60 minutes to form the first resin layer on the entire area of the outer surface of the fiber layer.

The first coating liquid was prepared by diluting the composition including the mixing materials shown in Table 1 with ion exchange water to have a solid content at a ratio of 36 mass %. The first coating liquid had a viscosity of 2000 m Pa·s (the value measured using a Brookfield viscometer under the condition of V6 (i.e., a rotational speed of 6 rpm, a temperature of 25° C.)). The first resin layer according to Example 1 was a non-porous layer.

TABLE 1

| Mixing material | Mixing ratio [mass parts of solid content] |
|---|---|
| NBR latex (Lx-550, manufactured by Zeon Corporation) | 100 |
| 10% KOH | 0.4 |
| Colloidal sulfur | 0.5 |
| Zinc oxide | 2 |
| Vulcanization accelerator (NOCCELER BZ, manufactured by OUCHI SHINKO CHEMICAL INDUSTRIAL CO., LTD.) | 0.2 |
| Aging inhibitor (VULKANOX (registered trademark) BKF) | 0.5 |
| Inorganic filler, defoaming agent, thickener, pigment | 5 |

Second Resin Layer

After the first resin later was formed on the entire area of the outer surface of the fiber layer, the fiber layer with the first resin layer formed thereon was immersed in water to wash the surface of the first resin layer.

Next, the fiber layer with the first resin layer having the washed surface was dried in an oven at 80° C. for 10 minutes, and then the three-dimensional hand form was cooled to 60° C.

Thereafter, the fiber layer with the first resin layer formed thereon was entirely immersed in a second coating liquid for forming a second resin layer, to apply the second coating liquid to the entire area of the outer surface of the first resin layer.

Then, the fiber layer with the second coating liquid applied thereto was dried in an oven at 80° C. for 60 minutes to form the second resin layer on the entire area of the outer surface of the first resin layer.

The second coating liquid was prepared in the same manner as the first coating liquid. The second resin layer according to Example 1 was also a non-porous layer.

Slip-Suppressing Layer

After the second resin layer was formed on the entire area of the outer surface of the first resin layer, the three-dimensional hand form was cooled to 60° C.

Next, a portion of the fiber layer with the second resin layer formed thereon, which extends from the fingertip parts to an area near a wrist part, was immersed in a third coating liquid for forming a slip-suppressing layer, to apply the third coating liquid.

Thereafter, the fiber layer with the third coating liquid applied thereto was dried in an oven at 80° C. for 60 minutes, and then further dried in an oven at 120° C. for 30 minutes, to form the slip-suppressing layer on the entire area of the outer surface of the second resin layer of the glove body.

The glove according to Example 1 was thus obtained.

Measurements of the thicknesses of the first resin layer, the second resin layer, and the slip-suppressing layer of the glove according to Example 1 found that the first resin layer has a thickness of 0.27 mm, the second resin layer has a thickness of 0.06 mm, and the slip-suppressing layer has a thickness of 0.04 mm. The thicknesses respectively of the first resin layer, the second resin layer, and the slip-suppressing layer were measured according to the method described in the DETAILED DESCRIPTION OF THE PREFERRED EMBODIMENT.

The third coating liquid was prepared by diluting the composition including the mixing materials shown in Table 2 with ion exchange water to have a solid content at a ratio of 15 mass %. The third coating liquid had a viscosity of 1000 m Pa·s (the value measured using a Brookfield viscometer under the condition of V6 (a rotational speed of 6 rpm, a temperature of 25° C.)).

As shown in Table 2 below, 6.9 parts by mass of the cellulose particles were added based on 100 parts by mass of a matrix resin (NBR latex and additives other than the cellulose particles).

As the cellulose particles, under-sized products obtained by sieving the cellulose particles using a stainless-steel sieve (JIS Z 8801) with a mesh size of 300 μm before being mixed in the third coating liquid were used.

An observation of a part of the cross section of the slip-suppressing layer of the glove according to Example 1 at a magnification of 500 times using a digital microscope (model VHX-6000, manufactured by KEYENCE CORPORATION) found that, as shown in FIG. 3A, at least some of the cellulose particles were partially exposed from the outer surface of the slip-suppressing layer, and the projections 14A and the recesses 14B formed a relatively small degree of unevenness on the outer surface of the slip-suppressing layer.

TABLE 2

| | Mixing material | Mixing ratio [mass parts of solid content] | No. of parts by mass of cellulose particles based on 100 parts by mass of resin and additives other than cellulose particles |
|---|---|---|---|
| Matrix resin | NBR latex (Lx-550, manufactured by Zeon Corporation) | 100 | |
| | 10% KOH | 0.4 | |
| | Colloidal sulfur | 0.5 | |
| | Zinc oxide | 2 | |
| | Vulcanization accelerator (NOCCELER BZ, manufactured by OUCHI SHINKO CHEMICAL INDUSTRIAL CO., LTD.) | 0.2 | |
| | Aging inhibitor (VULKANOX (registered trademark) BKF) | 0.5 | |
| | Inorganic filler, defoaming agent, thickener, pigment | 5 | |
| Cellulose particles (KC FLOCK (registered trademark) W-100GK) | | 7.5 | 6.9 |

The average particle size of the cellulose particles included in the slip-suppressing layer was 37 μm, according to the measurement thereof before mixing, using a laser diffraction-type particle-size-distribution measuring apparatus (Mastersizer 2000 manufactured by Malvern Panalytical Ltd). The average particle size of the cellulose particles was measured as follows. That is, the dedicated software called Mastersizer 2000 Software was used, the scattering type measurement mode was employed, and a wet cell through which dispersion liquid with the cellulose particles dispersed therein is circulated was irradiated with a laser beam, to obtain a scattered light distribution from the cellulose particles. Then, the scattered light distribution was approximated according to a log-normal distribution, and a particle size corresponding to the cumulative frequency of 50% (D50) within the preset range from the minimum value of 0.021 μm to the maximum value of 2000 μm in the obtained particle size distribution (horizontal axis, σ) was determined as the average particle size. In the measurement, the dispersion liquid for use was prepared by adding 60 mL of 0.5 mass % hexametaphosphoric acid solution to 350 mL of purified water. The concentration of the cellulose particles in the dispersion liquid was 10%. Before the measurement, the dispersion liquid including the cellulose particles was treated for two minutes using an ultrasonic homogenizer. Further, the measurement was performed while the dispersion liquid including the cellulose particles was agitated at an agitating speed of 1500 rpm.

The ratio of the length L to the width D of the cellulose particles, that is, the ratio L/D of the cellulose particles, was 6.3, according to the measurement thereof before mixing. The L and D of the cellulose particles were measured in the manner as aforementioned.

Example 2

The glove according to Example 2 was produced in the same manner as Example 1, except that 4.6 parts by mass of the cellulose particles were added based on 100 parts by mass of the matrix resin.

The ratio L/D of the cellulose particles was 6.3.

An observation of a part of the cross section of the slip-suppressing layer of the glove according to Example 2 in the same manner as in Example 1 found that, similar to what is shown in FIG. 3A, at least some of the cellulose particles were partially exposed from the outer surface of the slip-suppressing layer, and the projections 14A and the recesses 14B formed a relatively small degree of unevenness on the outer surface of the slip-suppressing layer.

Example 3

The glove according to Example 3 was produced in the same manner as Example 1, except that 2.3 parts by mass of the cellulose particles were added based on 100 parts by mass of the matrix resin.

The ratio L/D of the cellulose particles was 6.3.

An observation of a part of the cross section of the slip-suppressing layer of the glove according to Example 3 in the same manner as in Example 1 found that, similar to what is shown in FIG. 3A, at least some of the cellulose particles were partially exposed from the outer surface of the slip-suppressing layer, and the projections 14A and the recesses 14B formed a relatively small degree of unevenness on the outer surface of the slip-suppressing layer.

Example 4

The glove according to Example 4 was produced in the same manner as Example 1, except that 9.0 parts by mass of the cellulose particles were added based on 100 parts by mass of the matrix resin.

The ratio L/D of the cellulose particles was 6.3.

An observation of a part of the cross section of the slip-suppressing layer of the glove according to Example 4 in the same manner as in Example 1 found that, similar to what is shown in FIG. 3A, at least some of the cellulose particles were partially exposed from the outer surface of the slip-suppressing layer, and the projections 14A and the recesses 14B formed a relatively small degree of unevenness on the outer surface of the slip-suppressing layer.

Example 5

The glove according to Example 5 was produced in the same manner as Example 1, except that 2.3 parts by mass of the cellulose particles having an average particle size of 10 µm were added based on 100 parts by mass of the matrix resin.

The ratio L/D of the cellulose particles was 4.3.

An observation of a part of the cross section of the slip-suppressing layer of the glove according to Example 5 in the same manner as in Example 1 found that, similar to what is shown in FIG. 3A, at least some of the cellulose particles were partially exposed from the outer surface of the slip-suppressing layer, and the projections 14A and the recesses 14B formed a relatively small degree of unevenness on the outer surface of the slip-suppressing layer.

Example 6

The glove according to Example 6 was produced in the same manner as Example 5, except that 4.6 parts by mass of the cellulose particles were added based on 100 parts by mass of the matrix resin.

The ratio L/D of the cellulose particles was 4.3.

An observation of a part of the cross section of the slip-suppressing layer of the glove according to Example 6 in the same manner as in Example 1 found that, similar to what is shown in FIG. 3A, at least some of the cellulose particles were partially exposed from the outer surface of the slip-suppressing layer, and the projections 14A and the recesses 14B formed a relatively small degree of unevenness on the outer surface of the slip-suppressing layer.

Example 7

The glove according to Example 7 was produced in the same manner as Example 5, except that 6.9 parts by mass of the cellulose particles were added based on 100 parts by mass of the matrix resin.

The ratio L/D of the cellulose particles was 4.3.

An observation of a part of the cross section of the slip-suppressing layer of the glove according to Example 7 in the same manner as in Example 1 found that, similar to what is shown in FIG. 3A, at least some of the cellulose particles were partially exposed from the outer surface of the slip-suppressing layer, and the projections 14A and the recesses 14B formed a relatively small degree of unevenness on the outer surface of the slip-suppressing layer.

Example 8

The glove according to Example 8 was produced in the same manner as Example 5, except that 9.0 parts by mass of the cellulose particles were added based on 100 parts by mass of the matrix resin.

The ratio L/D of the cellulose particles was 4.3.

An observation of a part of the cross section of the slip-suppressing layer of the glove according to Example 8 in the same manner as in Example 1 found that, similar to what is shown in FIG. 3A, at least some of the cellulose particles were partially exposed from the outer surface of the slip-suppressing layer, and the projections 14A and the recesses 14B formed a relatively small degree of unevenness on the outer surface of the slip-suppressing layer.

Example 9

The glove according to Example 9 was produced in the same manner as Example 1, except that 2.3 parts by mass of the cellulose particles having an average particle size of 24 µm were added based on 100 parts by mass of the matrix resin.

The ratio L/D of the cellulose particles was 3.8.

An observation of a part of the cross section of the slip-suppressing layer of the glove according to Example 9 in the same manner as in Example 1 found that, similar to what is shown in FIG. 3A, at least some of the cellulose particles were partially exposed from the outer surface of the slip-suppressing layer, and the projections 14A and the recesses 14B formed a relatively small degree of unevenness on the outer surface of the slip-suppressing layer.

Example 10

The glove according to Example 10 was produced in the same manner as Example 9, except that 9.0 parts by mass of the cellulose particles were added based on 100 parts by mass of the matrix resin.

The ratio L/D of the cellulose particles was 3.8.

An observation of a part of the cross section of the slip-suppressing layer of the glove according to Example 10 in the same manner as in Example 1 found that, similar to what is shown in FIG. 3A, at least some of the cellulose particles were partially exposed from the outer surface of the slip-suppressing layer, and the projections 14A and the recesses 14B formed a relatively small degree of unevenness on the outer surface of the slip-suppressing layer.

Example 11

The glove according to Example 11 was produced in the same manner as Example 1, except that 2.3 parts by mass of the cellulose particles having an average particle size of 45 µm were added based on 100 parts by mass of the matrix resin.

The ratio L/D of the cellulose particles was 5.8.

An observation of a part of the cross section of the slip-suppressing layer of the glove according to Example 11 in the same manner as in Example 1 found that, similar to what is shown in FIG. 3A, at least some of the cellulose particles were partially exposed from the outer surface of the slip-suppressing layer, and the projections 14A and the recesses 14B formed a relatively small degree of unevenness on the outer surface of the slip-suppressing layer.

Example 12

The glove according to Example 12 was produced in the same manner as Example 11, except that 4.6 parts by mass of the cellulose particles were added based on 100 parts by mass of the matrix resin.

The ratio L/D of the cellulose particles was 5.8.

An observation of a part of the cross section of the slip-suppressing layer of the glove according to Example 12 in the same manner as in Example 1 found that, similar to what is shown in FIG. 3A, at least some of the cellulose particles were partially exposed from the outer surface of the slip-suppressing layer, and the projections 14A and the recesses 14B formed a relatively small degree of unevenness on the outer surface of the slip-suppressing layer.

Example 13

The glove according to Example 13 was produced in the same manner as Example 11, except that 6.9 parts by mass of the cellulose particles were added based on 100 parts by mass of the matrix resin.

The ratio L/D of the cellulose particles was 5.8.

An observation of a part of the cross section of the slip-suppressing layer of the glove according to Example 13 in the same manner as in Example 1 found that, similar to what is shown in FIG. 3A, at least some of the cellulose particles were partially exposed from the outer surface of the slip-suppressing layer, and the projections 14A and the recesses 14B formed a relatively small degree of unevenness on the outer surface of the slip-suppressing layer.

Example 14

The glove according to Example 14 was produced in the same manner as Example 11, except that 9.0 parts by mass of the cellulose particles were added based on 100 parts by mass of the matrix resin.

The ratio L/D of the cellulose particles was 5.8.

An observation of a part of the cross section of the slip-suppressing layer of the glove according to Example 14 in the same manner as in Example 1 found that, similar to what is shown in FIG. 3A, at least some of the cellulose particles were partially exposed from the outer surface of the slip-suppressing layer, and the projections 14A and the recesses 14B formed a relatively small degree of unevenness on the outer surface of the slip-suppressing layer.

Comparative Example 1

The glove according to Comparative Example 1 was produced in the same manner as Example 1, except that 27.6 parts by mass of the cellulose particles were added based on 100 parts by mass of the matrix resin.

The ratio L/D of the cellulose particles was 6.3.

Figure 3B:
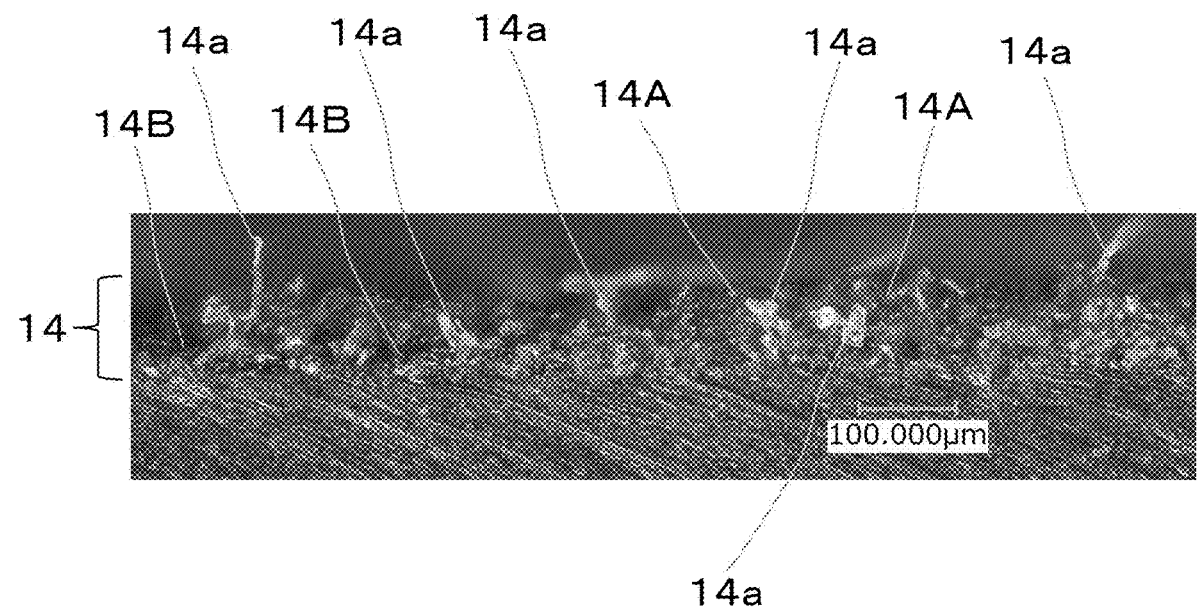
FIG. 3B is a microscopic photo showing an enlarged cross-sectional view of a part of a slip-suppressing layer of a glove according to Comparative Example 1.

An observation of a part of the cross section of the slip-suppressing layer of the glove according to Comparative Example 1 in the same manner as in Example 1 found that, as shown in FIG. 3B, at least some of the cellulose particles were partially exposed from the outer surface of the slip-suppressing layer, and the projections 14A and the recesses 14B formed a relatively large degree of unevenness on the outer surface of the slip-suppressing layer.

Comparative Example 2

The glove according to Comparative Example 2 was produced in the same manner as Example 1, except that 13.8 parts by mass of the cellulose particles were added based on 100 parts by mass of the matrix resin.

The ratio L/D of the cellulose particles was 6.3.

An observation of a part of the cross section of the slip-suppressing layer of the glove according to Comparative Example 2 in the same manner as in Example 1 found that, similar to what is shown in FIG. 3B, at least some of the cellulose particles were partially exposed from the outer surface of the slip-suppressing layer, and the projections 14A and the recesses 14B formed a relatively large degree of unevenness on the outer surface of the slip-suppressing layer.

Comparative Example 3

The glove according to Comparative Example 3 was produced in the same manner as Example 1, except that 9.2 parts by mass of the cellulose particles were added based on 100 parts by mass of the matrix resin.

The ratio L/D of the cellulose particles was 6.3.

An observation of a part of the cross section of the slip-suppressing layer of the glove according to Comparative Example 3 in the same manner as in Example 1 found that, similar to what is shown in FIG. 3B, at least some of the cellulose particles were partially exposed from the outer surface of the slip-suppressing layer, and the projections 14A and the recesses 14B formed a relatively large degree of unevenness on the outer surface of the slip-suppressing layer.

Comparative Example 4

The glove according to Comparative Example 4 was produced in the same manner as Example 1, except that 0.92 parts by mass of the cellulose particles were added based on 100 parts by mass of the matrix resin.

The ratio L/D of the cellulose particles was 6.3.

An observation of a part of the cross section of the slip-suppressing layer of the glove according to Comparative Example 4 in the same manner as in Example 1 found that no cellulose particles appeared to be partially exposed from the outer surface of the slip-suppressing layer, and the projections 14A and the recesses 14B formed an extremely small degree of unevenness on the outer surface of the slip-suppressing layer.

Comparative Example 5

The glove according to Comparative Example 5 was produced in the same manner as Example 5, except that 0.92 parts by mass of the cellulose particles were added based on 100 parts by mass of the matrix resin.

The ratio L/D of the cellulose particles was 4.3.

An observation of a part of the cross section of the slip-suppressing layer of the glove according to Comparative Example 5 in the same manner as in Example 1 found that no cellulose particles appeared to be partially exposed from the outer surface of the slip-suppressing layer, and the projections 14A and the recesses 14B formed an extremely small degree of unevenness on the outer surface of the slip-suppressing layer.

Comparative Example 6

The glove according to Comparative Example 6 was produced in the same manner as Example 11, except that 0.92 parts by mass of the cellulose particles were added based on 100 parts by mass of the matrix resin.

The ratio L/D of the cellulose particles was 5.8.

An observation of a part of the cross section of the slip-suppressing layer of the glove according to Comparative Example 6 in the same manner as in Example 1 found that no cellulose particles appeared to be partially exposed from the outer surface of the slip-suppressing layer, and the projections 14A and the recesses 14B formed an extremely small degree of unevenness on the outer surface of the slip-suppressing layer.

Comparative Example 7

The glove according to Comparative Example 7 was produced in the same manner as Example 1, except that the type of slip-suppressing particles included in the third coating liquid was a composite (having an average particle size of 100 μm) of nitrile butadiene rubber particles (NBR particles) and acrylic rubber particles (AR particles), and that 38 parts by mass of the slip-suppressing particles were added based on 100 parts by mass of the matrix resin. The average particle size of the composite was measured in the same manner as in the case of cellulose particles.

An observation of a part of the cross section of the slip-suppressing layer of the glove according to Comparative Example 7 at a magnification of 500 times using a digital microscope (model VHX-6000, manufactured by KEYENCE CORPORATION) found that at least some of the NBR particles and the AR particles as the slip-suppressing particles were partially exposed from the outer surface of the slip-suppressing layer, and the projections 14A and the recesses 14B formed a relatively large degree of unevenness on the outer surface of the slip-suppressing layer.

For the gloves according to Examples and Comparative Examples, the types of slip-suppressing particles included in the third coating liquid, the average particle sizes of the slip-suppressing particles, and the numbers of parts by mass of the slip-suppressing particles added are shown in Table 3 below.

The evaluation results of grippability on ice are also shown in Table 3 below.

Further, the evaluation results of the amount of flaking from gloves are shown in Table 3 below. The amounts of flaking subjected to the evaluation include the amount of flaking in the tape peeling test and the amount of flaking in the rubbing abrasion test. The rubbing abrasion test was carried out using gloves not immersed in water (dry) and gloves immersed in water (water immersion).

TABLE 3

|  | EX. 1 | EX. 2 | EX. 3 | EX. 4 |
|---|---|---|---|---|
| Type of slip-suppressing particles | Cellulose particles | Cellulose particles | Cellulose particles | Cellulose particles |
| Ave. particle size [μm] | 37 | 37 | 37 | 37 |
| No. of parts by mass added [parts by mass] | 6.9 | 4.6 | 2.3 | 9.0 |
| Grippability evaluation [ave.] | 2.5 | 1.5 | 0.8 | 2.7 |
| Amount of flaking in tape peeling test | 2.4 | 2.4 | 3.0 | 2.4 |
| Amount of flaking in rubbing abrasion test (dry) | 2.4 | 2.4 | 2.7 | 1.8 |
| Amount of flaking in rubbing abrasion test (water immersion) | 2.1 | 2.4 | 2.7 | 1.8 |
|  | EX. 5 | EX. 6 | EX. 7 | EX. 8 |
| Type of slip-suppressing particles | Cellulose particles | Cellulose particles | Cellulose particles | Cellulose particles |
| Ave. particle size [μm] | 10 | 10 | 10 | 10 |
| No. of parts by mass added [parts by mass] | 2.3 | 4.6 | 6.9 | 9.0 |
| Grippability evaluation [ave.] | 0.5 | 1.0 | 1.0 | 1.2 |
| Amount of flaking in tape peeling test | 3.0 | — | — | 2.4 |
| Amount of flaking in rubbing abrasion test (dry) | 3.0 | — | — | 3.0 |
| Amount of flaking in rubbing abrasion test (water immersion) | 3.0 | — | — | 2.7 |
|  | EX. 9 | EX. 10 | EX. 11 | EX. 12 |
| Type of slip-suppressing particles | Cellulose particles | Cellulose particles | Cellulose particles | Cellulose particles |
| Ave. particle size [μm] | 24 | 24 | 45 | 45 |
| No. of parts by mass added [parts by mass] | 2.3 | 9.0 | 2.3 | 4.6 |
| Grippability evaluation [ave.] | 0.5 | 1.2 | 0.7 | 1.5 |
| Amount of flaking in tape peeling test | 3.0 | 2.4 | 3.0 | — |
| Amount of flaking in rubbing abrasion test (dry) | 3.0 | 1.8 | 3.0 | — |
| Amount of flaking in rubbing abrasion test (water immersion) | 3.0 | 1.8 | 3.0 | — |
|  | EX. 13 | EX. 14 | C. EX. 1 | C. EX. 2 |
| Type of slip-suppressing particles | Cellulose particles | Cellulose particles | Cellulose particles | Cellulose particles |
| Ave. particle size [μm] | 45 | 45 | 37 | 37 |
| No. of parts by mass added [parts by mass] | 6.9 | 9.0 | 27.6 | 13.8 |
| Grippability evaluation [ave.] | 2.6 | 2.6 | 3.0 | 2.9 |
| Amount of flaking in tape peeling test | — | 1.8 | 0 | 1.8 |
| Amount of flaking in rubbing abrasion test (dry) | — | 1.8 | 0 | 1.8 |
| Amount of flaking in rubbing abrasion test (water immersion) | — | 1.8 | 0 | 0.6 |
|  | C. EX. 3 | C. EX. 4 | C. EX. 5 | C. EX. 6 |
| Type of slip-suppressing particles | Cellulose particles | Cellulose particles | Cellulose particles | Cellulose particles |
| Ave. particle size [μm] | 37 | 37 | 10 | 45 |
| No. of parts by mass added [parts by mass] | 9.2 | 0.92 | 0.92 | 0.92 |
| Grippability evaluation [ave.] | 2.9 | 0 | 0 | 0 |

TABLE 3-continued

| Amount of flaking in tape peeling test | 1.8 | 3.0 | — | — |
|---|---|---|---|---|
| Amount of flaking in rubbing abrasion test (dry) | 1.8 | 3.0 | — | — |
| Amount of flaking in rubbing abrasion test (water immersion) | 1.0 | 3.0 | — | — |

| | C. EX. 7 |
|---|---|
| Type of slip-suppressing particles | NBR particles + AR particles |
| Ave. particle size [μm] | 100 |
| No. of parts by mass added [parts by mass] | 38 |
| Grippability evaluation [ave.] | 0 |
| Amount of flaking in tape peeling test | 1.8 |
| Amount of flaking in rubbing abrasion test (dry) | 1.0 |
| Amount of flaking in rubbing abrasion test (water immersion) | 1.0 |

Grippability Evaluation

The gloves according to Examples and Comparative Examples were evaluated for their grippability when ice was grasped, the results of which are shown in Table 3. The grippability was evaluated by sensory evaluation. Specifically, the evaluation was performed by 6 test subjects who wore the gloves according to Examples and Comparative Examples, grasped a cylindrically-shaped ice having a diameter of about 9 cm and a height of about 9 cm, and evaluated the grippability according to four grades, followed by dividing the total points by the number of the test subjects (6 test subjects). The four grades include 0 point, 1 point, 2 points, and 3 points, each grade indicating as follows. 0 point: Not capable of grasping ice. 1 point: Capable of grasping ice but not stably. 2 points: Capable of easily grasping ice. 3 points: Capable of firmly grasping ice.

The gloves according to Examples and Comparative Examples were evaluated for their grippability after being immersed in water at 30° C. for an hour.

Evaluation of the Amount of Flaking in the Tape Peeling Test

The amount of flaking in the tape peeling test was evaluated as follows:
(1) Attach one side of a strip of double-sided tape (No. 539R manufactured by Nitoms, Inc.) that is 30 mm wide×30 mm long, to one side of a disc (with a diameter of 28.5 mm) used for the Abrasion Resistance test according to the European Standard EN 388.
(2) Place the slip-suppressing layer of a glove on the other side of the double-sided tape, and then press-bond the slip-suppressing layer against the other side of double-sided tape at a pressure of 0.66 N/cm² for 5 minutes.
(3) Peel the slip-suppressing layer of the glove off the other side of the double-sided tape, and visually observe the other side of the double-sided tape.

The visual observation was carried out according to four grades. The four grades include 0 point, 1 point, 2 points, and 3 points, each grade indicating as follows. 0 point: An extremely large amount of flaking is visually observed. 1 point: A large amount of flaking is visually observed. 2 points: A small amount of flaking is visually observed. 3 points: An extremely small amount of flaking is visually observed.

The amount of flaking in the tape peeling test was evaluated by arithmetically averaging the points obtained for three different places of the slip-suppressing layer of each of the gloves according to Examples and Comparative Examples.

The amount of flaking in the tape peeling test was evaluated for the gloves according to Examples 1 to 5, 8 to 11, and 14, and Comparative Examples 1 to 4 and 7.

Evaluation of the Amount of Flaking in the Rubbing Abrasion Test

In the rubbing abrasion test, the amount of flaking from gloves immersed in water (water immersion) was evaluated as follows:
(1) Immerse gloves for both right and left hands according to each of Examples and Comparative Examples in water at 30° C. for an hour.
(2) Wipe off moisture attached to the gloves for both right and left hands according to each of Examples and Comparative Examples, and then put the gloves respectively on the right hand and the left hand.
(3) Rub together the palm part of the right glove put on the right hand and the palm part of the left glove put on the left hand 50 times over a sheet of white paper at a speed at which the palm parts reciprocate once in a second (i.e., make the palm parts reciprocate 25 times), and visually observe the amount of flakes that have fallen on a sheet of colored paper enabling ease of visual observation of the amount of flaking.

The visual observation was carried out according to four grades, including 0 point, 1 point, 2 points, and 3 points. The same evaluation grades as those used in the aforementioned tape peeling test were applied.

In the rubbing abrasion test, the amount of flaking from gloves not immersed in water (dry) was evaluated in the same manner as in the aforementioned gloves immersed in water, except that the right and left gloves were not immersed in water at 30° C. for an hour.

The amount of flaking in the rubbing abrasion test was evaluated by taking three pairs of gloves of each Example and Comparative Example as test samples, and arithmetically averaging the scores of the three test samples.

The amount of flaking in the rubbing abrasion test was evaluated for the gloves according to Examples 1 to 5, 8 to 11, and 14, and Comparative Examples 1 to 4 and 7.

The gloves were evaluated as being inferior in anti-flaking characteristics when the average score of the amount of flaking from the gloves was 1.0 or less in any of the tape peeling test, the rubbing abrasion test using gloves not immersed in water (dry), and the rubbing abrasion test using gloves immersed in water (water immersion).

Table 3 shows that the glove according to Comparative Example 7 is evaluated as being inferior in grippability, and evaluated as a bad glove in terms of the amount of flaking from the glove.

It is shown that the gloves according to Comparative Examples 1 to 3 are evaluated as being excellent in grippability, but evaluated as being inferior in terms of the amount of flaking from the gloves. That is, it is found that these gloves have excellent grippability on ice but fail to sufficiently suppress the flaking from the respective slip-suppressing layers.

It is shown that the glove according to Comparative Example 4 is evaluated as being excellent in terms of the amount of flaking from the glove, but evaluated as being inferior in grippability. That is, it is found that the glove can sufficiently suppress the flaking from the slip-suppressing layer but fails to exhibit sufficient grippability on ice.

It is shown that the gloves according to Comparative Examples 5 and 6 are evaluated as being inferior in grippability, similar to Comparative Example 4.

It is shown, in contrast, that the gloves according to Examples 1 to 14 are evaluated as being excellent in grippability, and evaluated as being excellent in terms of the amount of flaking from the gloves. That is, it is found that the gloves can both exhibit grippability on ice and suppress the flaking from the respective slip-suppressing layers.

It is concluded from the aforementioned that a glove can both exhibit grippability on an ice-containing object and suppress the flaking from the slip-suppressing layer when the slip-suppressing layer includes more than 1 part and 9 parts or less by mass of the cellulose particles.

REFERENCE SIGNS LIST

1: Glove
10: Glove body
11: Fiber layer
12: First resin layer
13: Second resin layer
14: Slip-suppressing layer
20: Cuff
21: Fiber layer
22: First resin layer
23: Second resin layer
14a: Cellulose particles
14A: Projection
14B: Recess

What is claimed is:

1. A glove comprising:
a glove body configured to cover a hand of a wearer, wherein
the glove body comprises an outermost layer including a matrix resin and cellulose particles and constituting an outer surface of the glove,
the outermost layer includes the cellulose particles in the range of 4 parts or more to 9 parts or less by mass based on 100 parts by mass of the matrix resin,
the cellulose particles comprise fibrous particles having a ratio L/D being 2.0 or more and 6.3 or less, where D represents a width of each of the fibrous particles and L represents a length of each of the fibrous particles, and
the cellulose particles have an average size of 10 μm or more and 37 μm or less and at least some of the cellulose particles are at least partially exposed from the outer surface.

* * * * *